United States Patent [19]

Ishikawa et al.

[11] Patent Number: 4,908,511
[45] Date of Patent: Mar. 13, 1990

[54] LIGHT BEAM SCANNING DEVICE

[75] Inventors: Hiromi Ishikawa; Masaru Noguchi, both of Kanagawa, Japan

[73] Assignee: Fuji Photo Film Co., Ltd., Kanagawa, Japan

[21] Appl. No.: 229,876

[22] Filed: Aug. 8, 1988

[30] Foreign Application Priority Data

Aug. 7, 1987 [JP] Japan .................... 62-198800

[51] Int. Cl.⁴ .............................. H01J 3/14
[52] U.S. Cl. ............................ 250/235; 350/6.8
[58] Field of Search ..................... 250/234–236; 350/6.8; 358/206, 208, 293

[56] References Cited

U.S. PATENT DOCUMENTS

| 3,573,849 | 4/1971 | Herriot et al. | 358/206 |
| 4,243,294 | 1/1981 | Noguchi | 350/6.8 |
| 4,408,826 | 10/1983 | Ike | 350/6.8 |
| 4,429,220 | 1/1984 | Noguchi | 250/236 |

Primary Examiner—David C. Nelms
Assistant Examiner—Khaled Shami
Attorney, Agent, or Firm—Sughrue, Mion, Zinn, Macpeak & Seas

[57] ABSTRACT

A light deflector such as a polygon mirror deflects a synchronizing light beam and a scanning light beam which are applied thereto at different angles. A first focusing optical system is disposed between the light deflector and an object to be scanned by the scanning light beam for focusing the scanning light beam on the object. A synchronizing signal generator including a reference grating plate generates a synchronizing signal from the synchronizing light beam applied to the reference grating plate. A second focusing optical system is disposed between the first focusing optical system and the reference grating plate for focusing the synchronizing light beam applied through the first focusing optical system on the reference grating plate. Image information is read from the object or read on the object based on the synchronizing signal.

7 Claims, 3 Drawing Sheets

LIGHT BEAM SCANNING DEVICE

BACKGROUND OF THE INVENTION

The present invention relates to a light beam scanning device, and more particularly to a light beam scanning device for applying a synchronizing light beam via a light deflector and an image-forming optical system to a reference grating plate to generate a synchronizing signal and for applying a scanning light beam from the light deflector to an object to scan the object for reading an image or the like from or recording an image or the like on the image based on the synchronizing signal.

There is known an image scanning reading/reproducing system for applying a light beam to scan a recording medium with image information recorded thereon to photoelectrically read the recorded image information for thereby producing an image signal, and modulating a light beam with the image signal and scanning another recording medium such as a photographic photosensitive medium or the like with the modulated light beam to form a visible image thereon.

For accurate reproduction of the image information, a synchronizing signal is generated each time the light beam for reading the recorded image information is deflected a certain interval, and the recorded information is photoelectrically read under the control of the generated synchronizing signal. When recording the image information, a synchronizing signal is also produced for controlling the modulation of the light beam and application thereof to the other recording medium.

One known light beam scanning device is illustrated in FIG. 1 of the accompanying drawings, the device having a means for generating such a synchronizing signal. The illustrated light beam scanning device scans a stimulable phosphor sheet S carrying recorded image information with a laser beam L to photoelectrically reads the recorded image information. When a certain phosphor is exposed to a radiation such as X-rays, α-rays, β-rays, γ-rays, cathode rays, or ultraviolet rays, for example, the phosphor stores a part of the energy of the radiation. When the phosphor exposed to the radiation is subsequently exposed to stimulating rays such as visible light, the phosphor emits light in proportion to the stored energy. The phosphor exhibiting such a property is referred to as a "stimulable phosphor", and the stimulable phosphor sheet S is a sheet having a layer of such stimulable phosphor.

In the light beam scanning device, a laser beam L emitted from a laser oscillating tube 2 is deflected in the direction of the arrow A by a polygon mirror 4 to pass through a scanning lens 6. The laser beam L is then divided by a half-silvered mirror 8 into a scanning laser beam $L_1$ and a scanning laser beam L, which go in different directions that are about 90° spaced from each other.

The scanning laser beam $L_1$ reflected by the mirror 8 scans the stimulable phosphor sheet S in a main scanning direction (indicated by the arrow B) upon rotation of the polygon mirror 4. The stimulable phosphor sheet S is fed in an auxiliary scanning direction (indicated by the arrow C) by a sheet feed mechanism (not shown). Therefore, the scanning laser beam $L_1$ scans the entire surface of the stimulable phosphor sheet S two-dimensionally. In response to application of the scanning laser beam $L_1$, the stimulable phosphor sheet S emits light in an intensity proportional to the image information recorded thereon. The emitted light is then applied to a photomultiplier 12 through a light guide 10 with its light entrance end disposed over the stimulable phosphor sheet S along the main scanning line thereon. The light received by the photomultiplier 12 is converted thereby into an electric signal, which will be displayed on a display unit such as a CRT or recorded on a recording medium such as a magnetic tape.

The synchronizing laser beam L, that has passed through the mirror 8 falls on a reference grating plate 16 of a synchronizing signal generator 14, and is applied through a cylindrical light collecting bar 18 disposed behind the reference grating plate 16 to light sensors 20a, 20b mounted on the opposite ends, respectively, of the light collecting bar 18. The reference grating plate 16 has typically an array or linear pattern 22 of alternate slits and bars along the direction in which the synchronizing laser beam $L_2$ sweeps. Therefore, the synchronizing laser beam $L_2$ which positionally corresponds to the scanning laser beam $L_1$ is applied as a pulsed light signal to the light sensors 20a, 20b. As a result, the light sensors 20a, 20b produce a synchronizing signal from the applied pulsed light signal, which is employed to accurately read the image information from the stimulable phosphor sheet S.

In the conventional light beam scanning device, the laser beam L emitted from the common laser oscillating tube 2 is applied to the half-silvered mirror 8 to produce the scanning laser beam $L_1$ and the synchronizing laser beam $L_2$. In order to apply the synchronizing laser beam $L_2$ accurately to the reference grating plate 16 under the same conditions as the scanning laser beam $L_1$ is applied to the stimulable phosphor sheet S, the distance between the mirror 8 and the reference grating plate 16 should be equal to the distance between the mirror 8 and the stimulable phosphor sheet S. Therefore, the synchronizing signal generator 14 including the reference grating plate 16 projects outwardly, making the light beam scanning device large in size.

SUMMARY OF THE INVENTION

It is a major object of the present invention to provide a light beam scanning device of a small size which applies a synchronizing light beam via a light deflector and an image-forming optical system to a reference grating plate to generate a synchronizing signal and which applies a scanning light beam from the light deflector to an object to scan the object for reading an image or the like from or recording an image or the like on the object based on the synchronizing signal.

Another object of the present invention is to provide a light beam scanning device for scanning an object to read image information therefrom or record image information thereon, comprising: light source means for generating a synchronizing light beam and a scanning light beam; a light deflector for deflecting the synchronizing light beam and the scanning light beam; a first focusing optical system disposed between the light deflector and the object for focusing the scanning light beam on the object; a synchronizing signal generator including a reference grating plate, for generating a synchronizing signal from the synchronizing light beam applied to the reference grating plate; a second focusing optical system disposed between the first focusing optical system and the reference grating plate for focusing the synchronizing light beam applied through the first focusing optical system on the reference grating plate; and means for reading the image information from or recording the image information on the object based on the synchronizing signal.

Still another object of the present invention is to provide a light beam scanning device wherein the light source means comprises means for applying the synchronizing and scanning light beams at different angles to the light deflector, the second focusing optical system being disposed in a light path for the synchronizing light beam deflected by the light deflector.

Yet another object of the present invention is to provide a light beam scanning device according to claim 1, wherein the light deflector comprises a polygon mirror.

Yet still another object of the present invention is to provide a light beam scanning device according to claim 1, wherein the first focusing optical system comprises a scanning optical system for linearly scanning the scanning light beam over the object at a constant speed.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 2:
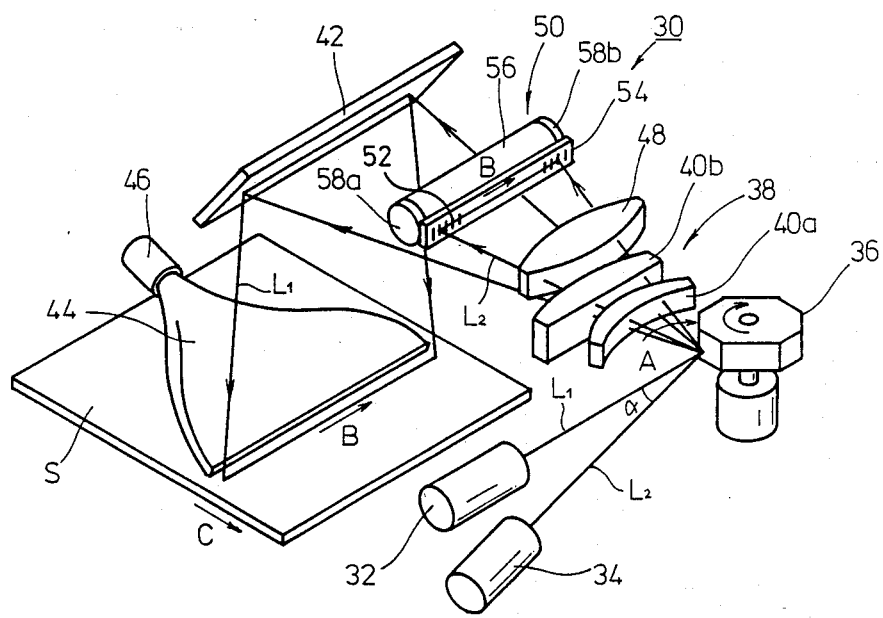
FIG. 2 is a schematic perspective view of a light beam scanning device according to the present invention.
Figure 3:
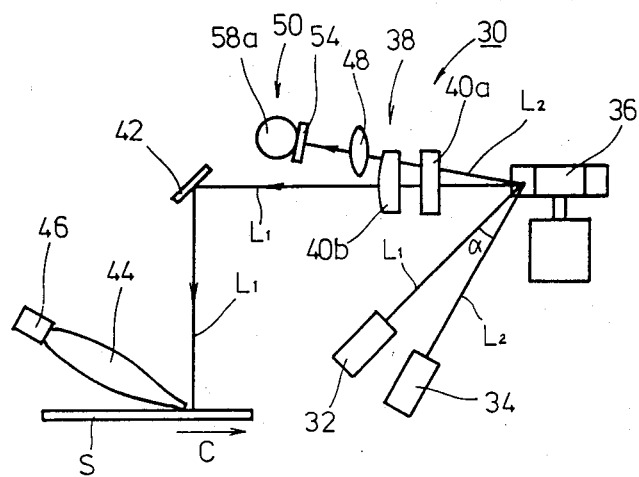
FIG. 3 is a schematic side elevational view of the light beam scanning device shown in FIG. 2.

As shown in FIGS. 2 and 3, a light beam scanning device, generally designated by the reference numeral 30, has a laser oscillating tube 32 for emitting a scanning laser beam $L_1$ and another laser oscillating tube 34 for emitting a synchronizing laser beam $L_2$. The laser oscillating tubes 32, 34 are positioned and oriented such that the synchronizing laser beam $L_2$ applied to a light deflector 36 comprising a polygon mirror is angularly displaced downwardly from the scanning laser beam $L_1$ applied to the light defector 36 through an angle $\alpha$.

The polygon mirror 36 is rotated about its own axis at high speed to deflect the scanning laser beam $L_1$ and the synchronizing laser beam $L_2$ in the direction of the arrow A and apply them to a scanning lens assembly 38. The scanning lens assembly 38 comprises two focusing lenses 40a, 40b, and serves as an $f\theta$ lens. The scanning laser beam $L_1$ that has passed through the scanning lens assembly 38 is applied to a total reflection mirror 42 extending along the direction in which the scanning laser beam $L_1$ sweeps, and is reflected by the mirror 42 toward a stimulable phosphor sheet S to scan the same in a main scanning direction (indicated by the arrow B). A light guide 44 has one end (light entrance end) disposed adjacent to and extending along the main scanning line on the stimulable phosphor sheet S. A photomultiplier 46 is mounted on the other end (light exist end) of the light guide 44.

The synchronizing laser beam $L_2$ which has passed through the scanning lens assembly 38 goes along a light path which is angularly displaced from the light path in which the scanning laser beam $L_1$ travels. A focusing lens 48 serving as a focusing optical system is disposed in the light path of the synchronizing light beam $L_2$. The synchronizing light beam $L_2$ having passed through the focusing lens 48 is then applied to a synchronizing signal generator 50. The synchronizing signal generator 50 comprises a reference grating plate 54 having a linear pattern 52 of typically slits and bars along the direction in which the synchronizing laser beam L, sweeps the reference grating plate 54, a cylindrical light collecting rod 56 disposed behind and held closely against the reference grating plate 54, and a pair of light sensors 58a, 58b mounted on the respective opposite ends of the light collecting rod 56.

The light beam scanning device 30 according to the present invention is basically constructed as described above. Operation and advantages of the light scanning device 30 will now be described below.

The synchronizing laser beam $L_2$ emitted from the laser oscillating tube 34 is reflected by the polygon mirror 36 which is being rotated at high speed, and is applied to the scanning lens assembly 38. The scanning lens assembly 38 converges and directs the synchronizing laser beam L, toward the focusing lens 48, while the synchronizing laser beam $L_2$ is being reflected and deflected in the direction of the arrow A (FIG. 2) by the polygon mirror 36. Then, the synchronizing laser beam $L_2$ applied to the focusing lens 48 is converged thereby onto the reference grating plate 54 while scanning the reference grating pate 54 in the direction of the arrow B. The synchronizing laser beam $L_2$ that has passed through the slit-bar pattern 52 on the reference grating plate 54 travels in the light collecting rod 56, while repeatedly reflected by he inner reflecting surface of the rod 56, toward the light sensors 58a, 58b as a pulsed light signal. The light sensors 58a, 58b photoelectrically converts the applied light signal into an electric signal from which a desired synchronizing signal will be generated.

Figure 1:
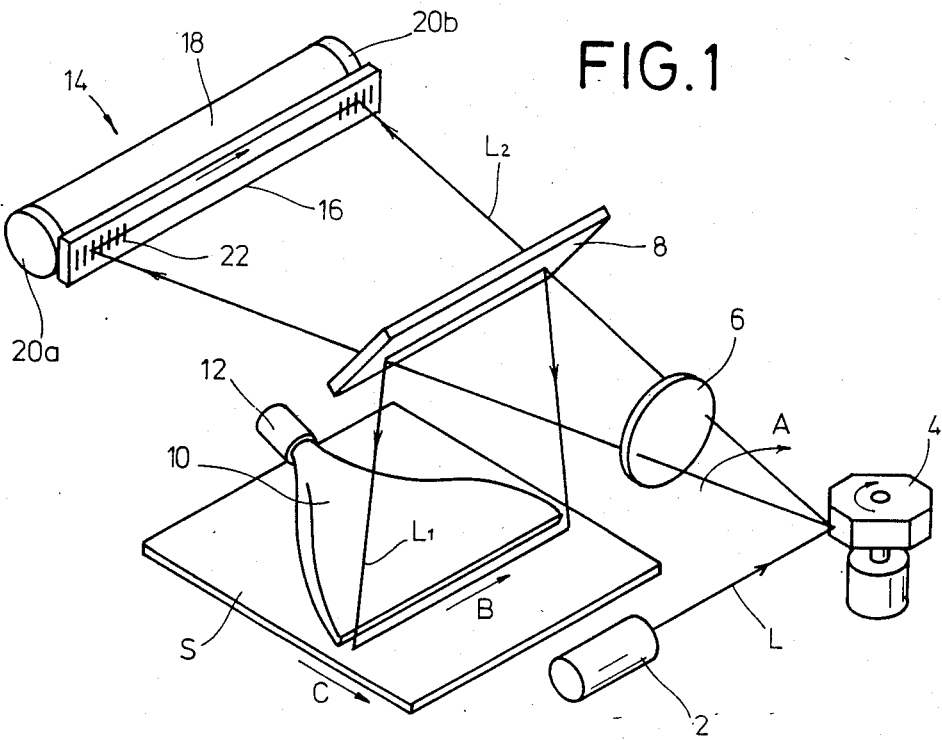
FIG. 1 is a schematic perspective view of a conventional light beam scanning device.

The optical distance between the polygon mirror 36 and the synchronizing signal generator 50 should be equal to the optical distance between the polygon mirror 36 and the stimulable phosphor sheet S in order to obtain accurate image information therefrom in response to the synchronizing signal. Therefore, the synchronizing signal generator 50 may be positioned closer to the scanning lens assembly 38 than it is in the conventional arrangement shown in FIG. 1. The light converging effect of the focusing lens 48 is effective in reducing the range in which the reference grating plate 54 is scanned in the direction of the arrow B by the synchronizing laser beam $L_2$, with the result that the synchronizing signal generator 50 may be small in size. As a consequence, the light beam scanning device may be greatly reduced in size.

The scanning laser beam $L_1$ emitted from the laser oscillating tube 32 is reflected and deflected by the polygon mirror 36 which is rotating at high speed, and then scans the stimulable phosphor sheet S in the main scanning direction of the arrow B through the focusing lenses 40a, 40b and the total refection mirror 42. At the same time, the stimulable phosphor sheet S is fed in an auxiliary scanning direction indicated by the arrow C by a sheet feeder (not shown), so that image information carried on the stimulable phosphor sheet S is two-dimensionally scanned by the scanning laser beam $L_1$. In response to the application of the scanning laser beam $L_1$, the stimulable phosphor sheet S emits light which is guided by the light guide 44 to the photomultiplier 46. The image information recorded on the stimulable phosphor sheet S is read accurately based on the synchronizing signal. While in the illustrated embodiment the scanning laser beam $L_1$ and the synchronizing laser beam $L_2$ are produced from the respective light sources, they may be generated by dividing a laser beam emitted from a common light source.

With the present invention, as described above, the synchronizing signal is generated by applying the synchronizing laser beam via the light deflector and the focusing optical system to the reference grating plate, and the scanning laser beam is directed by the light deflector toward the object to be scanned, for reading image information from or recording image information on the object. Since the physical light path which the synchronizing laser beam travels is reduced by the focusing lens, the reference grating plate may be positioned closely to the light deflector, and also the length of the reference grating plate in the direction in which it is scanned by the synchronizing laser beam may be reduced. Consequently, the overall size of the light beam scanning device may greatly be reduced.

The principles of the present invention are also applicable to a device for recording an image or the like on an object to be scanned, such as a photographic photosensitive film.

Although a certain preferred embodiment has been shown and described, it should be understood that many changes and modifications may be made therein without departing from the scope of the appended claims.

What is claimed is:

1. A light beam scanning device for scanning an object to read image information therefrom or record image information thereon, comprising:
   light source means for generating a synchronizing light beam and a scanning light beam;
   a light deflector for deflecting the synchronizing light beam and said scanning light beam;
   a first focusing optical system disposed between said light deflector and the object for focusing said scanning light beam on the object;
   a synchronizing signal generator including a reference grating plate, for generating a synchronizing signal from the synchronizing light beam applied to said reference grating plate;
   a second focusing optical system disposed between said first focusing optical system and said reference grating plate for focusing the synchronizing light beam applied through said first focusing optical system on said reference grating plate; and
   means for reading the image information from or recording the image information on said object based on said synchronizing signal.

2. A light beam scanning device according to claim 1, wherein said light source means comprises means for applying the synchronizing and scanning light beams at different angles to said light deflector, said second focusing optical system being disposed in a light path for the synchronizing light beam deflected by said light deflector.

3. A light beam scanning device according to claim 1, wherein said light deflector comprises a polygon mirror.

4. A light beam scanning device according to claim 1, wherein said first focusing optical system comprises a scanning optical system for linearly scanning the scanning light beam over the object at a constant speed.

5. A light beam scanning device according to claim 1, wherein said second focusing optical system comprises means for converging said synchronizing light beam on said reference grating plate.

6. A light beam scanning device according to claim 1 wherein said synchronizing beam passes through both said first focusing optical system and said second focusing optical system, but wherein said scanning light beam does not pass through said second focusing optical system.

7. A light beam scanning device according to claim 1, further comprising means for reflecting said scanning light beam onto said object, wherein said synchronizing signal generator is disposed substantially in front of said means for reflecting toward said light deflector.

* * * * *